Dec. 30, 1952     A. J. SALEM     2,623,516
FRYING HOOD
Filed July 28, 1950
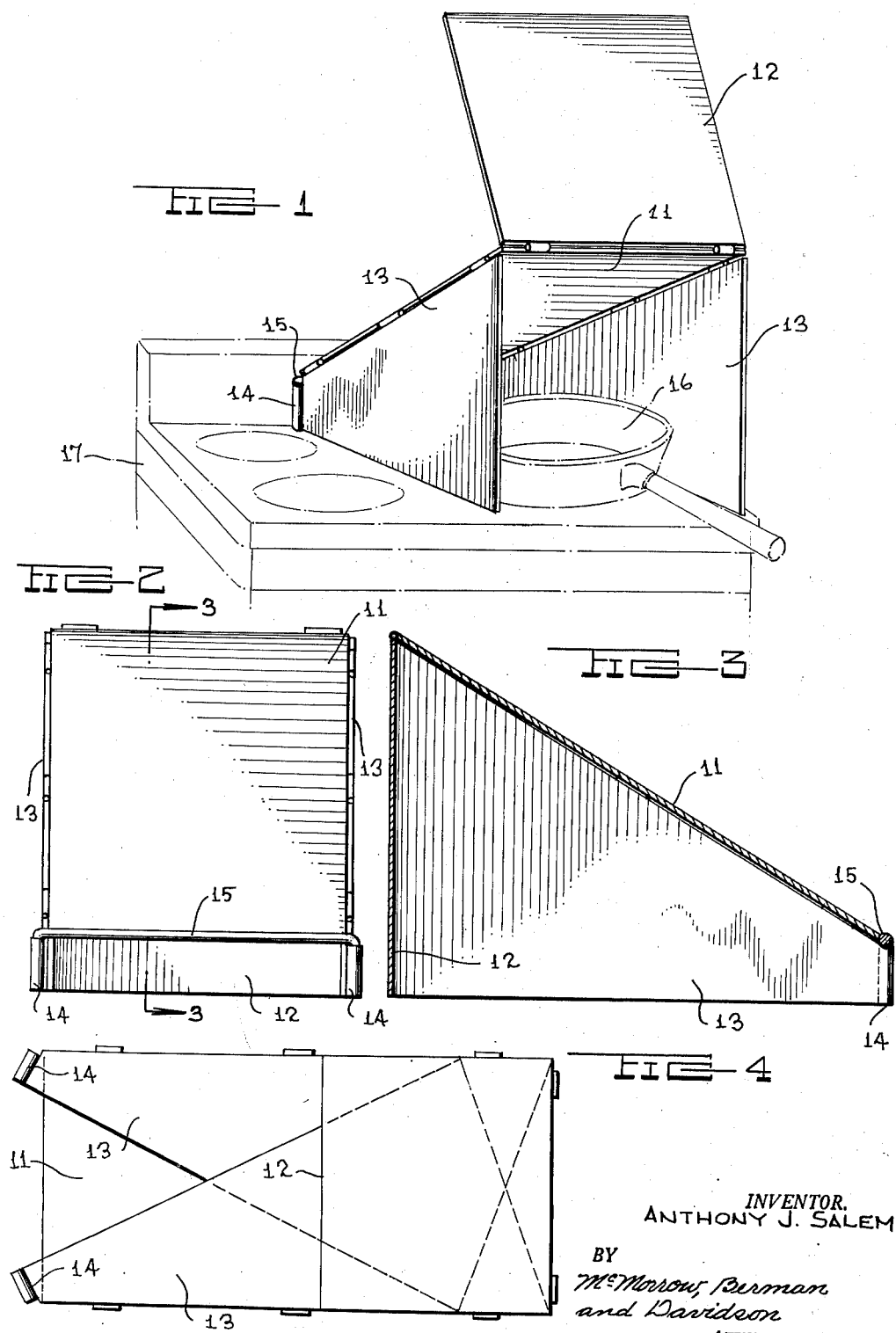
INVENTOR.
ANTHONY J. SALEM
BY
McMorrow, Berman
and Davidson
ATTORNEYS Patented Dec. 30, 1952

2,623,516

UNITED STATES PATENT OFFICE 2,623,516

FRYING HOOD

Anthony J. Salem, Boston, Mass.

Application July 28, 1950, Serial No. 176,393

2 Claims. (Cl. 126—299)

This invention relates to culinary devices, and more particularly to a hood device to be used as a protective hood over a frying pan or other utensil to prevent grease, oil, fat or the like from spattering from the frying pan over adjoining portions of a kitchen, and to provide protection for the person using the frying pan or other utensil against the hazards of burns, scalds and the like.

A main object of the invention is to provide a novel and improved protective hood device for use with cooking utensils, such as frying pans or the like, said device being very simple in construction, being easy to set up, and being foldable to a very compact condition when its use is not required.

A further object of the invention is to provide an improved culinary protective hood which may be employed over a frying pan or other utensil as a protection against spattering from the utensil, or which may be employed as a warming oven, the hood device being very inexpensive to manufacture, being sturdy in construction, being easy to set up and to fold to an inoperative condition, and being neat in appearance.

Further objects and advantages of the invention will become apparent from the following description and claims, and from the accompanying drawings, wherein:

Figure 1 is a perspective view showing an improved hood device according to the present invention in use on a cooking stove in protective relation to a frying pan;

Figure 2 is a rear end elevational view of the hood device of Figure 1;

Figure 3 is a longitudinal cross-sectional view taken on line 3—3 of Figure 2;

Figure 4 is a plan view of the hood device shown in folded position.

Referring to the drawings, the hood device comprises a flat, generally rectangular, top member 11 of suitable heat-resistant sheet material, such as sheet metal or the like, the top member 11 having hinged to its front edge the rectangular, flap member 12. The flap member 12 is similarly formed of suitable heat-resistant sheet material, such as sheet metal or the like. Hinged to the side edges of the top cover member 11 are the respective side flaps 13, 13, said side flaps being identical in shape and being, for example, trapezoidal. The rear margins of the side flaps 13, 13 are formed with sleeve portions 14, and designated at 15 is a generally U-shaped rod member whose arms are receivable in the sleeve portions 14, 14, as shown in Figure 2, thereby rigidly holding the flap members 13, 13 in depending, right angular relation to the top cover member 11. When the device is arranged as in Figures 1, 2 and 3, it defines a hood which may be disposed over a cooking utensil, such as a frying pan 16, disposed on a cooking stove 17. The hood device thus provides protection against spattering of material from the frying pan or the utensil, eliminating hazards of burning or scalding the person using the utensil. The device may also be employed as a warming oven by swinging the cover flap 12 to a closed position, as shown in Figure 3, whereby heat will be retained in the enclosure defined by the device.

When the use of the device is no longer required, the U-shaped rod member 15 is withdrawn from the sleeve members 14, 14, allowing the device to be folded to the flat condition thereof shown in Figure 4.

While a specific embodiment of an improved culinary hood device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A culinary foldable hood device of the type adapted to be mounted over a utensil on a stove for protection against spattering or the like comprising a flat top member, respective flat rigid side flap members hinged to the side edges of said top member and adapted to serve as supports for the hood device, respective sleeve elements formed on and being coextensive in length with the rear margins of said side flap members, said sleeve elements being at right angles to the bottom edges of said side flap members, and a generally U-shaped rigid connecting member, the legs of said connecting member being parallel and being receivable in said sleeve elements to secure the side flap members in fixed parallel depending positions at right angles to the top member.

2. A culinary foldable hood device of the type adapted to be mounted over a utensil on a stove for protection against spattering or the like comprising a flat rectangular rigid top member, respective identical trapezoidal flat side flap members hinged to the side edges of said top member and adapted to serve as supports for the hood device, a flat rectangular front flap member hinged to the front margin of said top member, respective sleeve elements formed on and coextensive in length with the rear margins of said side flap members, said sleeve elements being at right angles to the bottom edges of said side flap members, and a generally U-shaped rigid connecting member, the legs of said connecting member being parallel and being receivable in said sleeve elements to secure the side flap members in fixed parallel depending positions with respect to the top member, the transverse width of the side flap members being less than the transverse width of the top member, whereby said side flap members may be folded in overlapping relationship on said top member.

ANTHONY J. SALEM.

REFERENCES CITED

The following references are of record in the file of this patent:

UNITED STATES PATENTS

| Number | Name | Date |
|---|---|---|
| 143,288 | Lehnen | Sept. 30, 1873 |
| 356,722 | Lindley | Jan. 25, 1887 |
| 620,345 | Morawetz | Feb. 28, 1899 |
| 957,642 | Barker | May 10, 1910 |
| 1,001,383 | Geer et al. | Aug. 22, 1911 |
| 1,221,514 | Crain | Apr. 3, 1917 |
| 1,250,762 | Baird | Dec. 18, 1917 |
| 1,722,513 | Witter | July 30, 1929 |
| 1,974,643 | Collins | Sept. 25, 1934 |

FOREIGN PATENTS

| Number | Country | Date |
|---|---|---|
| 584,722 | Germany | Sept. 23, 1933 |
| 576,807 | Great Britain | Apr. 18, 1946 |